United States Patent
Park et al.

(10) Patent No.: US 9,513,942 B2
(45) Date of Patent: Dec. 6, 2016

(54) APPARATUS AND METHOD FOR PROVIDING CONTENTS SERVICE WITH VIRTUAL MACHINE

(71) Applicant: KT CORPORATION, Seongnam (KR)

(72) Inventors: Ju-Won Park, Daejeon (KR);
Jaehyoung Yoo, Seoul (KR);
Seung-Hee Han, Daejeon (KR);
Chan-Kyou Hwang, Daejeon (KR)

(73) Assignee: KT Corporation, Seongnam (KR)

( * ) Notice: Subject to any disclaimer, the term of this patent is extended or adjusted under 35 U.S.C. 154(b) by 500 days.

(21) Appl. No.: 13/714,713

(22) Filed: Dec. 14, 2012

(65) Prior Publication Data
US 2013/0160010 A1 Jun. 20, 2013

(30) Foreign Application Priority Data
Dec. 14, 2011 (KR) .................. 10-2011-0134633

(51) Int. Cl.
G06F 9/455 (2006.01)
G06F 9/50 (2006.01)

(52) U.S. Cl.
CPC ....... *G06F 9/45533* (2013.01); *G06F 9/45558* (2013.01); *G06F 9/5011* (2013.01); *G06F 2009/45562* (2013.01)

(58) Field of Classification Search
None
See application file for complete search history.

(56) References Cited

U.S. PATENT DOCUMENTS

| 2009/0216828 A1* | 8/2009 | Gebhart | G06F 9/5077 709/201 |
| 2010/0146507 A1* | 6/2010 | Kang et al. | 718/1 |
| 2011/0239010 A1* | 9/2011 | Jain | G06F 1/3209 713/310 |
| 2012/0159648 A1* | 6/2012 | Park | 726/28 |
| 2013/0130652 A1* | 5/2013 | Deasy | C09J 7/041 455/411 |

FOREIGN PATENT DOCUMENTS

| KR | 10-2010-0092850 A | 8/2010 |
| KR | 10 2010 0108090 A | 10/2010 |
| KR | 10-2010-0108090 A | 10/2010 |
| KR | 10-2010-0138689 A | 12/2010 |
| KR | 2012-0092850 A | 8/2012 |

* cited by examiner

*Primary Examiner* — Eric C Wai
(74) *Attorney, Agent, or Firm* — Sughrue Mion, PLLC

(57) ABSTRACT

An apparatus for providing a contents service includes a service request receiver configured to receive a contents service request from a user device, a device information manager configured to determine a type of the user device, a virtual machine generator configured to acquire template information corresponding to the determined type of the user device, and to generate a virtual machine based on the acquired template information, wherein the virtual machine generates contents in a format specific to the user device and a contents provider configured to provide the user device with the generated contents.

20 Claims, 3 Drawing Sheets

APPARATUS AND METHOD FOR PROVIDING CONTENTS SERVICE WITH VIRTUAL MACHINE

CROSS-REFERENCE TO RELATED APPLICATION

This application claims the benefit of priority from the Korean Patent Application No. 10-2011-0134633, filed on Dec. 14, 2011 in the Korean Intellectual Property Office, the entire disclosure of which is incorporated herein by reference in its entirety.

BACKGROUND

1. Field

Exemplary embodiments broadly relate to an apparatus and a method for providing contents service by using a virtual machine, and more specifically, exemplary embodiments relate to an apparatus and a method for providing different types of devices with contents service by using a virtual machine.

2. Description of Related Art

Recently, an N-screen service for providing a service by interworking various devices belonging to a single user is increasingly attracting attention.

The various types of devices have different performances. Thus, in order to provide single contents by interworking the multiple devices, contents data of the single contents encoded in various formats corresponding to each of the multiple devices.

That is, if a single device requests certain contents, the contents should be provided after being encoded in a format corresponding to that of a corresponding device. In order to encode the contents in the certain format, many resources are required.

Further, recently, attention is also being paid to a cloud computing technology that allows a user to use computing resources as much as necessary and pay for the amount of the resources that they have used. This cloud computing technology is still under development.

According to a related art, Korean Patent Publication No. 2010-0138689 discloses a configuration in which a virtual machine is provided on at least one server; a virtual device is provided on the provided virtual machine; and the provided virtual device is provided as a computing resource. Further, Korean Patent No. 0991582 describes a configuration in which contents is encoded to be appropriate for each of different types of devices when a set-top box streams the contents to the devices. Further, Korean Patent Publication No. 2012-0092850 discloses a configuration in which hardware resources provided by cloud providers are classified into grades based on their performance, and a virtual organization (VO) for hardware resources selected by a user is generated and provided to the user.

SUMMARY

Accordingly, it is an aspect to provide an apparatus and method of providing a user device with a requested contents service by allotting virtual resources to a virtual machine according to the type of the user device.

According to an aspect of exemplary embodiments, there is provided an apparatus for providing a contents service. The apparatus includes a service request receiver configured to receive a contents service request from a user device, a device information manager configured to determine a type of the user device, a virtual machine generator configured to acquire template information corresponding to the determined type of the user device, and to generate a virtual machine based on the acquired template information which is used in generating contents requested in the contents service request.

According to another aspect of exemplary embodiments, there is provided a method of providing contents. The method includes receiving a contents service request from a user device, determining a type of the user device, acquiring template information corresponding to the determined type of the user device, generating a virtual machine based on the acquired template information, which is used in generating contents requested in the contents service request.

In exemplary embodiments, the virtual resources are classified beforehand and are managed according to the types of the user devices that have requested the contents service, and the virtual machine is generated by allotting the virtual resources to the virtual machine according to their performances. By using the generated virtual machine, it is possible to generate contents data in a format corresponding to each user device and to provide each user device with the generated contents data.

BRIEF DESCRIPTION OF THE DRAWINGS

Non-limiting and non-exhaustive exemplary embodiments will be described in conjunction with the accompanying drawings. Understanding that these drawings depict only exemplary embodiments and are, therefore, not to be intended to limit its scope, the exemplary embodiments will be described with specificity and detail taken in conjunction with the accompanying drawings, in which.

DETAILED DESCRIPTION OF EXEMPLARY EMBODIMENTS

Figure 1:
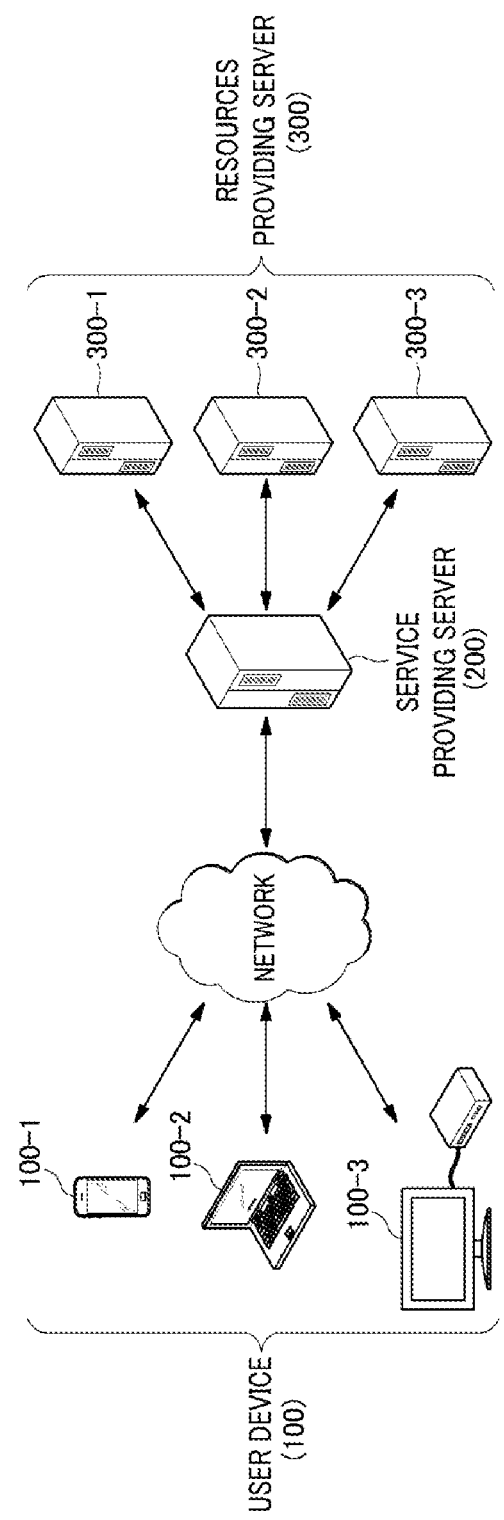
FIG. 1 is a view illustrating a configuration of a contents service providing system according to an exemplary embodiment.

Hereinafter, exemplary embodiments will be described in detail with reference to the accompanying drawings to be readily implemented by those skilled in the art. However, it is to be noted that the present disclosure is not limited to the exemplary embodiments, but can be realized in various other ways. In the drawings, certain parts not directly relevant to the description of exemplary embodiments are omitted to enhance the clarity of the drawings, and like reference numerals denote like parts throughout the whole document.

Throughout the whole document, the terms "connected to" or "coupled to" are used to designate a connection or coupling of one element to another element, and include both a case where an element is "directly connected or coupled to" another element and a case where an element is "electronically connected or coupled to" another element via still another element. Further, each of the terms "comprises," "includes," "comprising," and "including," as used in the present disclosure, is defined such that one or more other components, steps, operations, and/or the existence or addition of elements are not excluded in addition to the described components, steps, operations and/or elements.

Hereinafter, exemplary embodiments will be explained in detail with reference to the accompanying drawings.

FIG. 1 is a view illustrating a configuration of a contents service providing system according to an exemplary embodiment;

According to an exemplary embodiment, a user device 100 may include a multiple devices, and a user may request a contents service to a service providing server 200 for a single device among the multiple devices. A user device 100 may include by way of an exemplary a mobile terminal, a notebook, a TV with a set-top box, a computer, and so on. A service providing server 200 may include at least a memory and a processor.

Particularly, the user may make a request for a seamless service to the service providing server 200 to watch the same contents once provided to a first device 100-1 through a second device 100-2 seamlessly.

In response to the request from the user device 100, the service providing server 200 generates a virtual machine (VM) for providing the user device 100 with the contents service. The service providing server 200 may manage resources provided by at least one resources providing server 300, e.g., resources providing servers 300-1 to 300-3. The resources providing server 300 may include at least a memory and a processor. In response to the request from the user device 100, the service providing server 200 may generate the virtual machine for providing the contents service to the user device 100 by using the resources of the resources providing server 300.

The service providing server 200 may generate the virtual machine by allotting the resources of the resources providing server 300 according to the type of the user device 100 to the virtual machine. By way of example, assume that the user device 100 is an IPTV set-top box 100-3. In such a case, the contents reproduced in the IPTV set-top box 100-3 is continuously provided at one place, and there may be a low likelihood that the contents is temporarily stopped and a reproduction of the contents is resumed later in a repeated manner. Thus, the service providing server 200 may generate the virtual machine by allotting a memory and a storage having a relatively low price and a large capacity although their read or write speeds are low to the IPTV set-top box 100-3.

Meanwhile, in case that the user device 100 is a mobile device 100-1 such as a smart phone, the contents reproduced in the user device is highly likely to be reproduced while the user is moving, and it is highly likely that the contents would be temporarily stopped and reproduction of the contents would be resumed later, and that this start, stop process may be repeated. Accordingly, a read or write speed is more important than a clock speed of a central processing unit (CPU) for the mobile device 100-1. Thus, the service providing server 200 may generate the virtual machine by allotting a memory and a storage having a high read or write speed to the mobile device 100-1. That is, in an exemplary embodiment, the resources allocated may depend on the type of the user device 100. In other words, the virtual machine may be generated based on attributes of the user device.

It takes many resources and time to transcode contents having a different format to a format appropriate for the user device 100. The service providing server 200 may previously generate and store raw data of contents corresponding to the contents service that is to be requested by decoding the contents encoded in a certain codec by using virtual resources. Then, when the user device 100 requests the contents service, the service providing server 200 may encode the previously stored raw data of the contents into contents data and provide the encoded contents data to the user device 100.

Using the generated virtual machine, the service providing server 200 encodes the contents corresponding to the requested contents service in a format appropriate for the user device 100 by using the raw data of the contents.

The service providing server 200 may provide the contents data to the user device 100 by, e.g., a streaming method.

Figure 2:
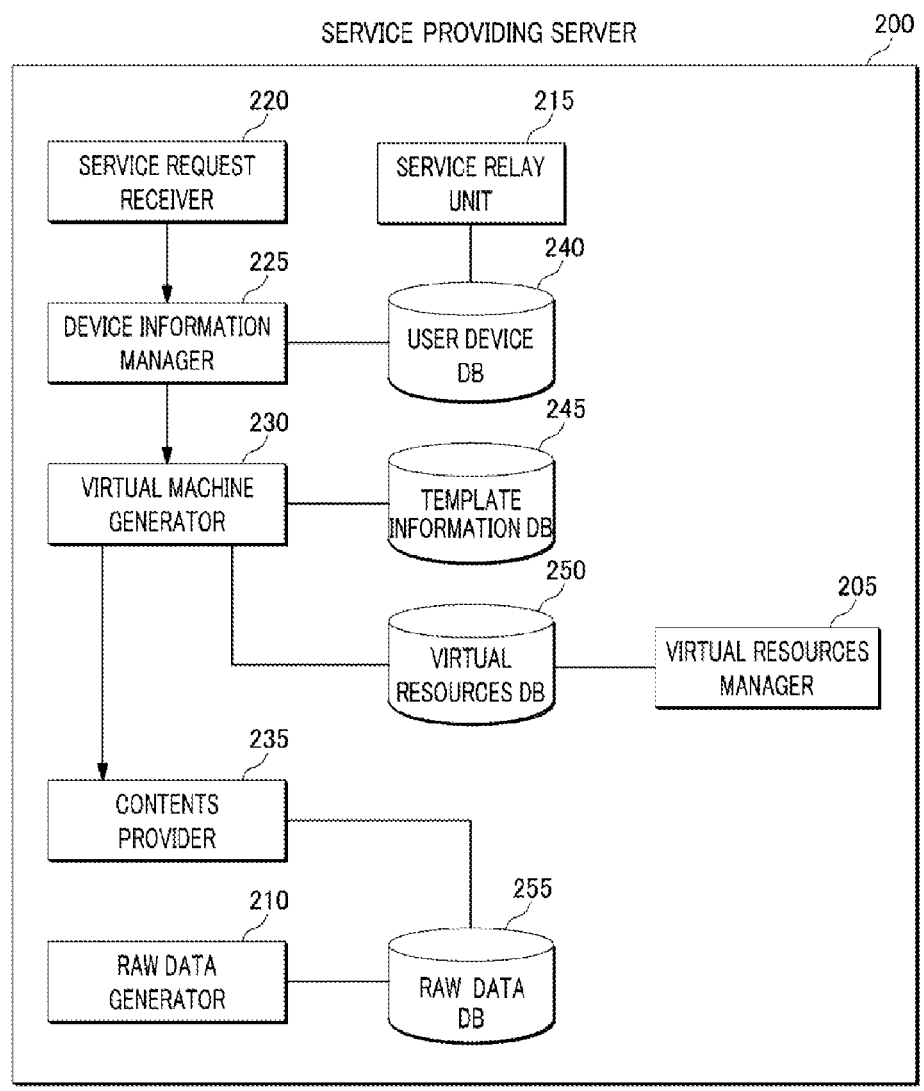
FIG. 2 is a block diagram illustrating a service providing server according to an exemplary embodiment.

FIG. 2 is a block diagram illustrating a service providing server according to an exemplary embodiment.

The service providing server according to the exemplary embodiment includes a virtual resources manager 205, a raw data generator 210, a service relay 215, a service request receiver 220, a device information manager 225, a virtual machine generator 230, a contents provider 235, a user device database 240, a template information database 245, a virtual resources database 250, and a raw data database 255.

The virtual resources manager 205 may classify virtual resources provided by at least one resources providing server 300 by their performances, and manage the classified virtual resources by using a virtualization technique. By way of an example, the virtual resource manager 205 may classify the resources by a clock speed of the CPU and manage them. Further, the virtual resource manager 205 may classify a memory and a storage such as a hard disk by a read or write speed and manage them.

The virtual resources manager 205 may store the information of the classified virtual resources in the virtual resources database 250.

Further, the virtual resources manager 205 may provide GUI for setting environment in order to reflect a policy of a manager of the service providing server 200. The virtual resources manager 205 may monitor the state of virtual resources continuously, and if there is a shortage of the virtual resources, the virtual resources manager 205 may additionally allot the virtual resources. Further, the virtual resources manager 205 may classify servers having hardware of different specifications by their respective types and performances and manage them by using a hardware resources virtualization technique. The virtual resources manager 205 may search for a currently usable resources and allot the usable resources for the generation of the virtual machine. Accordingly, the virtual resources manager 205 may monitor the state of the virtual resources periodically.

The raw data generator 210 may generate raw data from contents encoded in a certain codec by decoding the contents and storing the raw data in the raw data database 255. In order to provide a seamless service for different types of devices to watch the same contents seamlessly in the different types of devices, time delay before the contents is seamlessly provided should be minimized.

Accordingly, the time taken before the service providing server 200 generates the contents in a format appropriate for the changed device after detecting a change in the user device should be reduced. Accordingly, in order to perform only encoding instead of transcoding that requires much more resource and time, the raw data generator 210 may generate the raw data for each contents in advance.

The service relay 215 may classify the multiple devices of the user who has subscribed to the contents service and manage the classified devices. Here, the service relay 215 may classify the devices by their types. Further, the service relay 215 may collect and manage user's usage history, additional user-customized request, and so forth for each of the devices.

By way of an example, the service relay 215 may classify the multiple user devices by their types including a mobile device such as a smart phone or a tablet PC and a non-mobile device such as an IPTV set-top box or a PC. Further, the service relay 215 may also collect and manage a set value that the user additionally sets for each device, such as a resolution or a codec.

The service relay 215 may store such information of user devices in the user device database 240 together with identification information of each device.

Further, the service relay 215 may set and manage a session-connection with the user device, and collect user device information, and store the collected user device information in the user device database 240. The service relay 215 may monitor the connection state continuously. In order to prevent degradation of the quality of service (QoS) when the connection state is deteriorated, the service relay 215 may provide the manager of the service providing server 200 with the monitoring result. Further, the service relay 215 may serve to safely manage user information, contents information and a network, thus improving security.

The service request receiver 220 may receive the request for the contents service from the user device 100. In addition to the service request, the service request receiver 220 may also receive information of the requested contents and information of the user device to which the contents is to be provided.

Further, when the user device makes a request for a seamless service, the service request receiver 220 may also receive information indicating a time point in which the requested contents need to be reproduced.

In response to the request for the contents service received by the service request receiver 220, the device information manager 225 may determine, from the user device database 240, a device type of the user device that has requested the contents service.

By way of an example, the device information manager 225 may determine, from the user device database 240, whether the user device that has requested the contents service is a mobile device or not. Then, the device information manager 225 may provide the virtual machine generator 230 with the determined result.

The virtual machine generator 230 may acquire template information corresponding to the user device from the template information database 245 based on the device type of the user device received from the device information manager 225. The virtual machine generator 230 may generate a virtual machine for providing the contents service to the user device based on the acquired template information.

The virtual machine generator 230 may generate the virtual machine by allotting the virtual resources, to the virtual machine, which are stored in the virtual resources database 250 and managed by the virtual resources manager 205, according to the template information.

By way of an example, for a non-mobile device such as an IPTV set-top box or a PC, there may be acquired first type template information that instructs allocation of a memory and a storage having a low read or write speed but having a large capacity and a relatively low price, such as [Device Type=non mobile, CPU=2 core (3.6 GHz), Memory=2 GB (600 MB/s), Storage=2 GB (40 MB/s)].

As discussed above, in general, when the user receives the contents service such as the streaming service through a non-mobile device such as a smart TV or a PC, the service is provided at the same place for a relatively long time. In such a case, it is very unlikely that the contents is stopped, paused, and then resumed later. Thus, it may be efficient to use a hard-disk drive (HDD) having a large capacity and a low price although its read or write speed is low.

Further, as for a mobile device such as a smart phone or a tablet PC, there may be acquired second type template information that instructs allocation of a memory and a storage having a high read or write speed, such as [Device type=mobile, CPU=single core (2 GHz), Memory=1 GB (2 GB/s), Storage=500 MB (100 MB/s)].

As discussed above, when the user receives the contents service such as the streaming service through a mobile device such as a smart phone or a tablet PC, a service duration time during which the contents service is provided without interruption is short. That is, when the user is using a mobile device, he or she may be moving to various locations. Accordingly, the user may receive the contents service through the mobile device for a short time and resume the reception of the contents later after pausing the contents temporarily.

Accordingly, in order to support such usage pattern, a read or write speed in a memory or a storage is more important than a clock speed of the CPU.

Thus, for the user who has requested the contents service through the mobile device, it may be efficient to use a solid-state drive (SSD) or a flash memory resources having a high read or write speed among the virtual resources.

Based on the template information described above, the virtual machine generator 230 may generate the virtual machine for providing the requested contents service to the user device by using the virtual resources managed by the virtual resources manager 205.

The generated virtual machine may generate contents data by encoding the raw data of contents corresponding to the requested contents service in the raw data database 255 into a format appropriate for the user device by using the virtual machine generated by the virtual machine generator 230.

The contents provider 235 may transmit the generated contents data to the user device, thus providing the user device with the contents service.

According to an exemplary embodiment discussed above, by generating the virtual machine appropriate for the device type of the user device, the virtual resources can be efficiently used. Further, by generating the raw data of the contents beforehand and later encoding the raw data of the contents into the format appropriate for the user device by using the virtual machine, time consumption for providing the contents can be reduced. Thus, it is possible to provide the user with the contents service, particularly, the seamless service more promptly.

Figure 3:
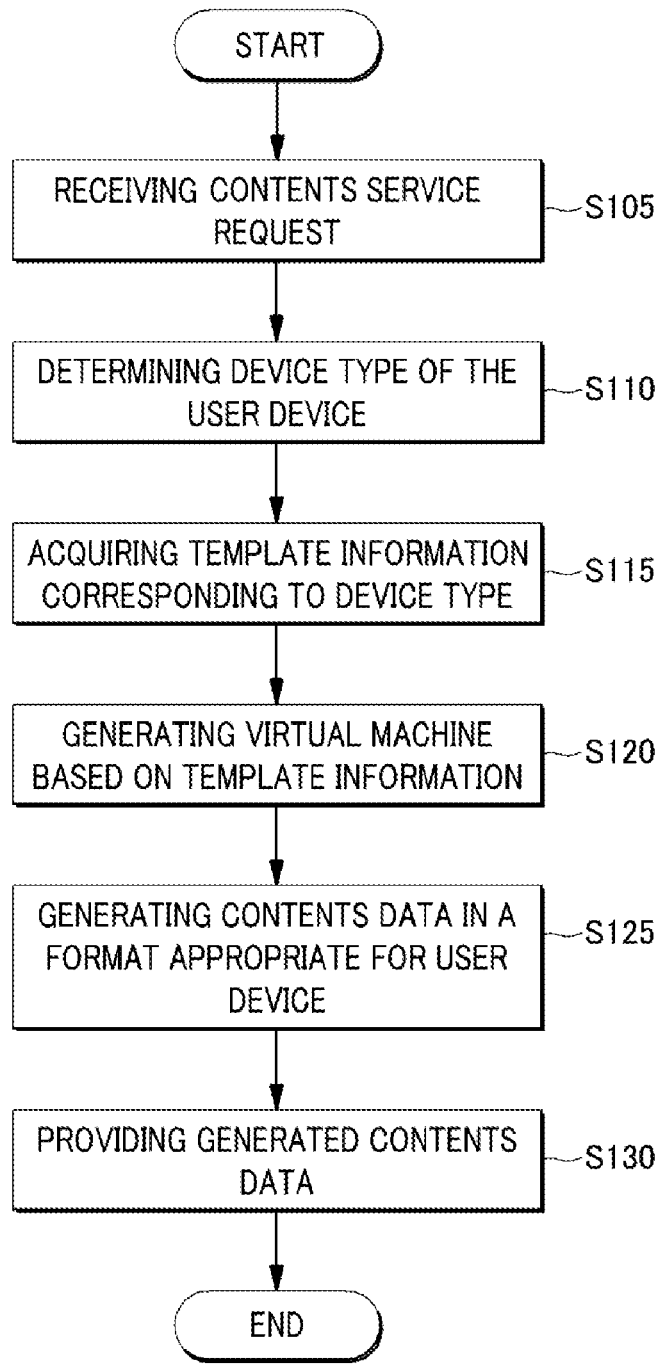
FIG. 3 is a flow diagram illustrating a contents service providing method by using a virtual machine according to an exemplary embodiment.

FIG. 3 is a flow diagram illustrating a contents service providing method by using a virtual machine according to an exemplary embodiment.

In operation S105, the service providing server 200 receives a contents service request from a user device 100.

In operation S110, by using identification information of the user device and contents information corresponding to the contents service request received in operation S105, the service providing server 200 authenticates whether the user device is authorized to receive the contents service. The service providing server 200 acquires user device information, particularly, information upon the type of the user device, by using the received identification information of the user device.

Further, in operation S110, the service providing server 200 determines a device type of the user device by using the acquired information of the user device. That is, the service providing server 200 determines whether the user device is a mobile device or a non-mobile device based on the user device information.

In operation S115, the service providing server 200 acquires template information corresponding to the determined type of the user device.

In operation S120, the service providing server 200 generates a virtual machine appropriate for providing the user device with the contents service based on the template information acquired in operation S115.

The service providing server 200 separately manages virtual resources provided on a cloud. When the request for the contents service is received from the user device, the service providing server 200 generates the virtual machine by allotting the virtual resources on the cloud based on the template information and user history information including a contents usage history and a user device setup.

In operation S125, the service providing server 200 controls the virtual machine to generate contents data in a format appropriate for the user device.

In operation S130, the service providing server 200 provides the user device with the contents service by transmitting the contents data generated in operation S125. That is, the service providing server encodes raw data of the contents into the contents data in a format appropriate for the user device 100 by using the generated virtual machine and then transmits the encoded contents data to the user device 100.

The service providing server 200 may store data which is not compacted in any format beforehand, i.e., the raw data of the contents by decoding the contents encoded by a specific codec, and may encode the contents raw data into contents data in a format appropriate for the user device 100.

Exemplary embodiments may be embodied in a transitory or non-transitory storage medium which includes instruction codes which are executable by a computer or processor, such as a program module which is executable by the computer or processor. A data structure according to exemplary embodiments may be stored in the storage medium and executable by the computer or processor. A computer readable medium may be any usable medium which can be accessed by the computer and includes all volatile and/or non-volatile and removable and/or non-removable media. Further, the computer readable medium may include any or all computer storage and communication media. The computer storage medium may include any or all volatile/non-volatile and removable/non-removable media embodied by a certain method or technology for storing information such as, for example, computer readable instruction code, a data structure, a program module, or other data. The communication medium may include the computer readable instruction code, the data structure, the program module, or other data of a modulated data signal such as a carrier wave, or other transmission mechanism, and includes information transmission mediums.

The above description of exemplary embodiments is provided for the purpose of illustration, and not by way of a limitation. It will be understood by those skilled in the art that various changes and modifications may be made without changing a technical conception and/or any essential features of the exemplary embodiments. Thus, above-described exemplary embodiments are exemplary in all aspects, and do not limit the present disclosure. For example, each component described to be of a single type can be implemented in a distributed manner. Likewise, components described to be distributed can be implemented in a combined manner.

The scope of the present inventive concept is defined by the following claims and their equivalents rather than by the detailed description of exemplary embodiments. It shall be understood that all modifications and embodiments conceived from the meaning and scope of the claims and their equivalents are included in the scope of the present inventive concept.

What is claimed is:

1. An apparatus for providing a contents service, the apparatus comprising:
   a service request receiver configured to receive a contents service request from a user device;
   a device information manager configured to determine a type of the user device; and
   a virtual machine generator which is implemented by a hardware processor and a memory, and which is configured to acquire template information corresponding to the determined type of the user device, and configured to generate a virtual machine based on the acquired template information which is used in generating contents requested in the contents service request,
   wherein the acquired template information includes first information relating to an allocation of a memory, second information relating to a capacity of a storage, and third information relating to a read or write speed of the storage, and wherein the acquired template information varies based on the determined type of the user device,
   wherein the type of the user device comprises one from among a mobile smart phone, a mobile tablet personal computer (PC), a non-mobile PC, and a non-mobile Internet Protocol television (IPTV).

2. The apparatus of claim 1, wherein the type of the user device comprises a mobile device type and a non-mobile device type.

3. The apparatus of claim 2, wherein a read or write speed of the virtual machine corresponding to the mobile device type is faster than a read or write speed of the virtual machine corresponding to the non-mobile device type.

4. The apparatus of claim 1, wherein the virtual machine generator is further configured to acquire a contents usage history of at least one user device belonging to a user of the user device, and is further configured to generate the virtual machine based on the contents usage history.

5. The apparatus of claim 1, further comprising:
   a raw data generator configured to generate raw data of contents corresponding to the contents service request by using virtual resources of the virtual machine; and
   a storage configured to store the generated raw data.

6. The apparatus of claim 5, further comprising a contents provider which is configured to generate the contents from the stored raw data.

7. The apparatus of claim 6, further comprising a storage configured to store the generated raw data in advance of generating the contents, wherein the contents provider generates the contents by encoding the stored raw data using an encoding process specific to the user device.

8. The apparatus of claim 1, further comprising:
   a virtual resources manager configured to manage virtual resources allotted to the virtual machine based on performance information of the virtual resources,
   wherein the virtual machine is generated based on the performance information of the virtual resources.

9. The apparatus of claim 1, wherein the virtual machine generates the contents in a format specific to the user device.

10. The apparatus of claim 1, further comprising: a contents provider configured to provide the user device with the contents generated by the virtual machine.

11. The apparatus of claim 1, wherein the template information specifies at least one of read and write speed and a memory capacity for a corresponding type of the user device.

12. The apparatus of claim 1, wherein the template information comprises a first template for a mobile type of the user device which has a higher read or write speed requirement than a read or write speed requirement of a second template for a non-mobile type of the user device.

13. The apparatus of claim 1, wherein when the determined type of the user device comprises one from among a non-mobile PC and a non-mobile IPTV, the second information includes information relating to a capacity of a storage which is greater than a predetermined threshold storage, and the third information includes information relating to a read or write speed of the storage which is lower than a predetermined threshold read or write speed, and when the determined type of the user device comprises one from among a mobile smart phone and a mobile tablet PC, the second information includes information relating to a capacity of a storage which is lesser than the predetermined threshold storage, and the third information includes information relating to a read or write speed of the storage which is greater than the predetermined threshold read or write speed.

14. A method of providing contents, the method comprising:

receiving a contents service request from a user device;
determining a type of the user device;
acquiring template information corresponding to the determined type of the user device; and
generating a virtual machine based on the acquired template information which generates contents requested in the contents service request,
wherein the acquired template information includes first information relating to an allocation of a memory, second information relating to a capacity of a storage, and third information relating to a read or write speed of the storage, and wherein the acquired template information varies based on the determined type of the user device,
wherein the determining the type of the user device comprises determining one from among a mobile smart phone, a mobile tablet personal computer (PC), a non-mobile PC, and a non-mobile Internet Protocol television (IPTV).

15. The method of claim 14, wherein a read or write speed of the virtual machine corresponding to a mobile device type is faster than a read or write speed of the virtual machine corresponding to a non-mobile device type.

16. The method of claim 14, further comprising:
acquiring a contents usage history of at least one user device belonging to a user of the user device, and
the virtual machine is generated based on the contents usage history.

17. The method of claim 14, further comprising:
generating raw data of the contents corresponding to the contents service request by using virtual resources of the virtual machine,
wherein the contents is generated by encoding the generated raw data.

18. The method of claim 14, further comprising:
managing virtual resources allotted to the virtual machine based on performance information of the virtual resources,
wherein the virtual machine is generated based on the performance information of the virtual resources.

19. The method of claim 14, further comprising: generating the contents in a format appropriate for the user device and providing the user device with the generated contents.

20. The method of claim 14, wherein when the determined type of the user device comprises one from among a non-mobile PC and a non-mobile IPTV, the second information includes information relating to a capacity of a storage which is greater than a predetermined threshold storage, and the third information includes information relating to a read or write speed of the storage which is lower than a predetermined threshold read or write speed, and when the determined type of the user device comprises one from among a mobile smart phone and a mobile tablet PC, the second information includes information relating to a capacity of a storage which is lesser than the predetermined threshold storage, and the third information includes information relating to a read or write speed of the storage which is greater than the predetermined threshold read or write speed.

\* \* \* \* \*